United States Patent [19]

Futa, Jr. et al.

[11] Patent Number: 5,518,025

[45] Date of Patent: May 21, 1996

[54] TWO SIGNAL HEAD SENSOR

[75] Inventors: Paul W. Futa, Jr., North Liberty, Ind.; Keith J. Kovac, St. Joseph, Mich.

[73] Assignee: Alliedsignal Inc., Morristown, N.J.

[21] Appl. No.: 463,136

[22] Filed: Jun. 5, 1995

[51] Int. Cl.$^6$ .................................................. F16K 31/143
[52] U.S. Cl. ........................... 137/468; 137/486; 137/488
[58] Field of Search .................................. 137/117, 486, 137/488, 501, 468

[56] References Cited

U.S. PATENT DOCUMENTS

| | | | |
|---|---|---|---|
| 2,633,869 | 4/1953 | Plank | 137/486 |
| 2,769,488 | 11/1956 | Harris et al. | 137/488 |
| 2,917,067 | 12/1959 | Pearl | 137/117 |
| 2,937,656 | 5/1960 | Evans et al. | 137/117 |
| 2,960,155 | 11/1960 | Bartz | 137/488 X |
| 3,072,110 | 1/1963 | Cramer | 137/486 X |
| 3,106,934 | 10/1963 | Rogers et al. | 137/117 |
| 3,862,644 | 1/1975 | Emmons et al. | 137/486 |
| 4,364,409 | 12/1982 | Jones | 137/486 |

FOREIGN PATENT DOCUMENTS 164477   9/1984   Japan ................... 137/486

*Primary Examiner*—Stephen M. Hepperle
*Attorney, Agent, or Firm*—Leo H. McCormick, Jr.; Larry J. Palguta

[57] ABSTRACT

A dual signal head sensor, which is a fluid pressure differential sensitive control valve, has a diaphragm responsive to changes in fluid pressure on opposite sides thereof and a ported sleeve having a spool valve axially movable in response to diaphragm motion. The head sensor monitors a fluid pressure differential and provides fluidic control signals in response to sensed variations in the pressure differential. A pair of chambers separated by the diaphragm receive variously pressurized fluids and thereby impress across the diaphragm the pressure differential being monitored. The head sensor has a ported sleeve with a high pressure inlet, a low pressure return, two control connections or dual signal outputs, and a movable spool having 4 lands. The spool is effective in certain positions to supply high pressure fluid to the first control connection while coupling the second control connection to the return line, and in other positions, to supply high pressure fluid to the second control connection while coupling the first control connection to the return line. There is a hydraulic coupling between the diaphragm and the spool that allows the diaphragm to move freely in response to variations in the sensed pressures being monitored resulting in modulation and amplification of the pressure forces acting on the movable spool valve. The head sensor includes a device for radially positioning the hydraulic coupling, a resilient spring member for establishing the preferred pressure differential, an external adjustment for fine calibration, and a bi-metallic disk stack for thermal compensation.

12 Claims, 2 Drawing Sheets

TWO SIGNAL HEAD SENSOR

The present invention relates to a flow control sensor for controlling the head or pressure differential across a variable size orifice and/or aperture in a fuel control used in an aircraft.

The use of an afterburner as a means for augmenting engine thrust wherein additional fuel is introduced into the exhaust duct of a turbine is well known. In such aircraft systems accurate control of fuel flow is important to maintain fuel economy and accuracy is even more important when operating in an afterburner environment to avoid flameout and operational inaccuracy due to improper fuel to air ratio supplied to operate a turbine engine.

The control of fuel flow can be achieved by maintaining a constant pressure differential across the variable aperture orifice of a metering valve through which fuel is supplied to a combustion chamber of a turbine engine. One such method for achieving such accuracy is described in U.S. Pat. No. 3,106,934 wherein orifice pressure differential is monitored to control a flow upstream of a metering valve in response to changes in the monitored pressure differential.

It is also known that accurate fuel flow is enhanced by monitoring the fuel pressure differential across a fuel metering valve to control a throttling valve downstream from the metering valve so as to maintain the pressure differential across the metering valve substantially constant. One prior art device for monitoring such a pressure differential employs a directed jet type servomechanism wherein a jet pipe nozzle is pivoted in response to changes in such pressure differential. The flow from this nozzle is distributed between various valve mechanism conduits in a proportion determined by the current position of the nozzle. Increased flow to one conduit increases pressure on one side of a valve spool to move the spool in one direction while an increase in flow to the other conduit increases the pressure on the opposite side of the spool causing it to move in the opposite direction. This know mechanism employs a relative large number of parts and is comparatively complex to assemble resulting in a sophisticated and costly head (differential pressure) sensing structure.

The present invention overcomes the problems enumerated above with respect to the prior art by providing a dual signal head sensor for maintaining a constant fuel pressure differential across an operational orifice of a metering valve without using a jet pipe nozzle by utilizing a movable diaphragm. The movable diaphragm forms a pair of chambers on opposite sides of the orifice to receive pressurized fluid to impress across the diaphragm the pressure differential across the metering valve orifice. The diaphragm is hydraulically coupled to a 4-land, 4-way spool valve having an axially movable spool, a high pressure inlet, a low pressure return, and first and second control connections, the spool being effective in first positions to supply high pressure fluid to the first control connection while coupling a second control connection to the return line while in second positions to supply high pressure fluid to the second control connection and coupling the first control connection to the return conduit. An equilibrium null height resulting from pressure balancing exists in the hydraulic coupling between the diaphragm and the spool such that spool motion follows diaphragm motion, thus, the spool moves in response to small changes in the aperture pressure differential as impressed upon the diaphragm. In a preferred form, the fluid is the fuel eliminating the need for other operational fluids such as pneumatic or electrical connections in this part of a fuel supply system.

BRIEF DESCRIPTION OF THE DRAWINGS

In the following description, corresponding reference characters indicate corresponding parts throughout the several views in the drawings.

DETAILED DESCRIPTION OF THE INVENTION

Figure 1:
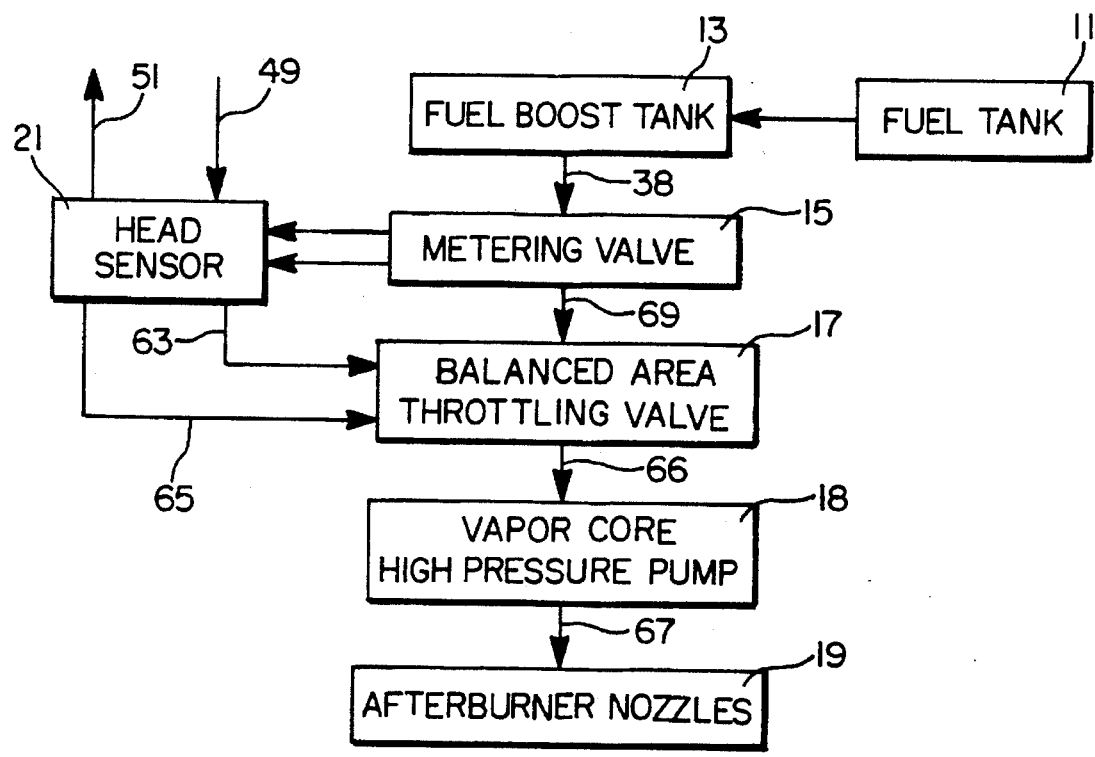
FIG. 1 is a schematic representation of an afterburner function in an aircraft fuel system.

A fuel boost pump 13 is shown in FIG. 1 for supplying fuel from a source 11 to variable orifice engine afterburner nozzles 19 along the following path, conduit 38 which connects boost pump 13 to metering valve 15, conduit 69 which connects metering valve 15 with throttling valve 17 and vapor core high pressure pump 18 and conduit 67 which connects high pressure pump 18 to afterburner nozzles 19. A control arrangement as defined by the invention disclosed herein, includes a head sensor assembly 21 for maintaining a constant fuel pressure differential across the metering orifice of the metering valve 15 by controlling the throttling valve 17 to accurately supply fuel to the afterburner nozzles 19. Head sensor assembly 21 monitors the pressure differential across the aperture of metering valve 15 and controls the position of a downstream throttling valve 17 so as to maintain a fixed pressure differential across the metering valve 15. Maintaining a fixed pressure differential across the metering valve 15 is required so that metered flow is solely a function of scheduled metering valve position (area change of metering aperture).

Figure 3:
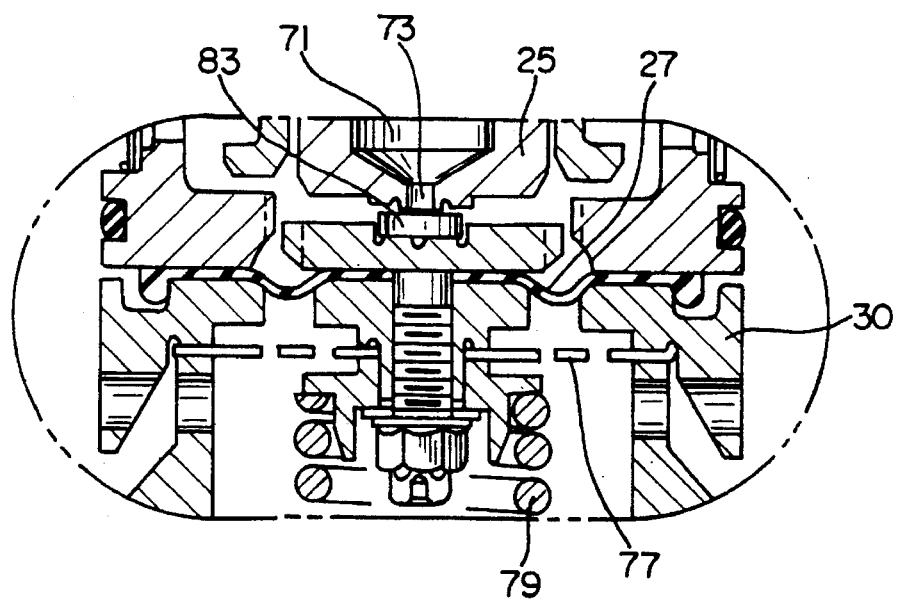
FIG. 3 is an enlarged view of a hydraulic coupling for the diaphragm and spool valve of FIG. 2.
Figure 2:
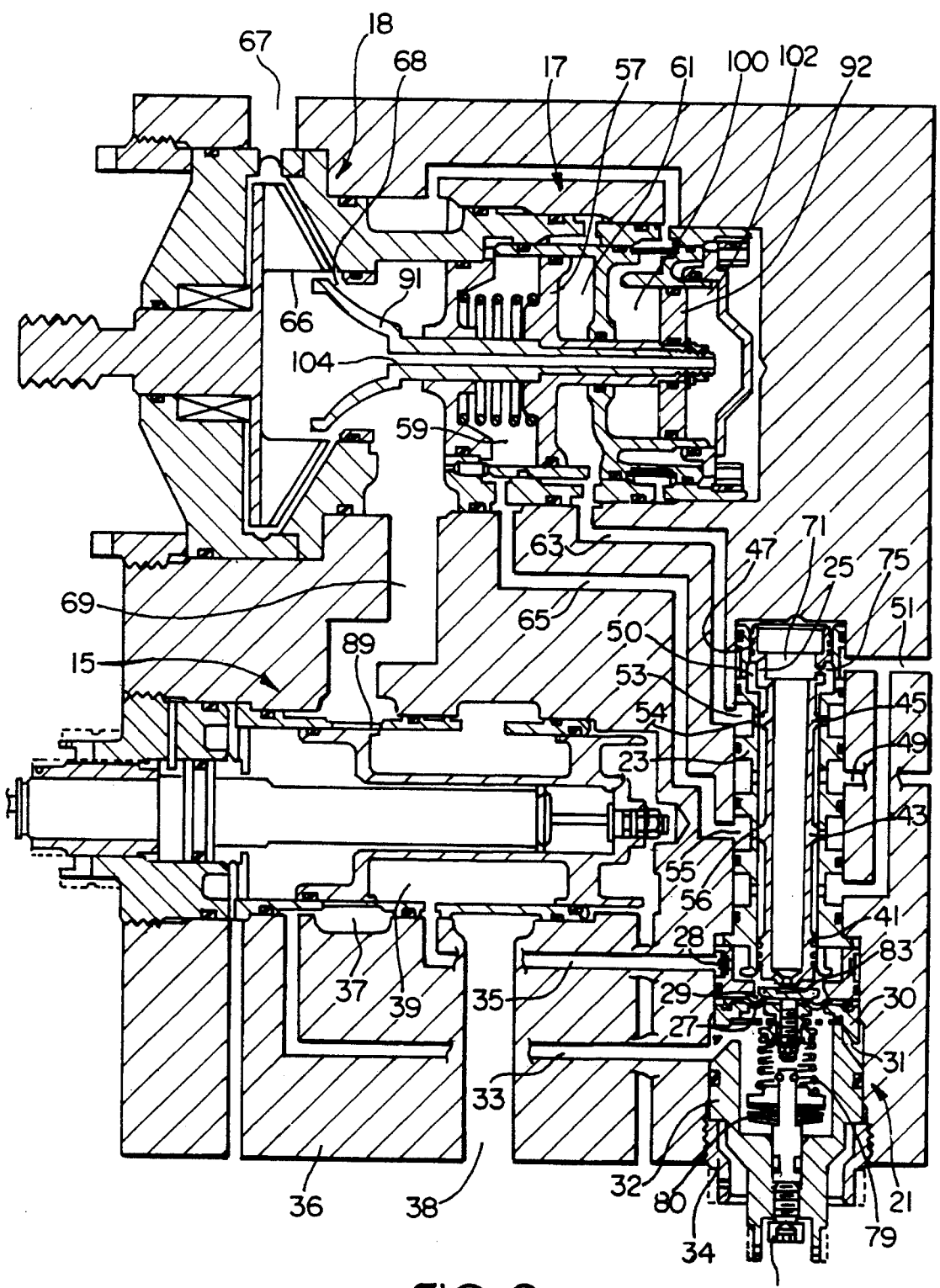
FIG. 2 is a schematic including sectional views of a metering valve, head sensor, throttling valve and vapor core high pressure pump of FIG. 1.

As best seen in FIG. 2 and 3, a hydraulic coupling forms an equilibrium null height between diaphragm 27 and spool 25 so that the spool 25 moves and is axially positioned within a ported sleeve 23 in response to and in unison with movement or motion of diaphragm 27. With this coupling, small variations in sense pressure freely alter the position of the diaphragm 27 and the hydraulic coupling will modulate the pressure forces acting on the spool, resulting in significant force amplification to position spool valve 25. Further benefit resides in the ability to shape control ports 54 and 56 associated with lands 45 and 43 on the movable spool 25 to control the positional gain of the downstream throttling valve 18. This structure increases the integrity of head sensor assembly 21 to provide greater accuracy in the fuel metering system.

The pressure differential across metering valve 15, or more precisely, the differential across variable aperture 89 is the difference between the pressures in cavities 37 and 39. This pressure difference is replicated across the diaphragm 27 by conduit 33 which conveys fuel pressure from cavity 37 of aperture 89 to chamber 31 and conduit 35 which conveys fuel pressure from cavity 39 of aperture 89 through a contamination barrier screen 28 to chamber 29. It is these said pressures that urge the movement of diaphragm 27.

The position of diaphragm 27 is biased by a reference spring 79, to establish a desired pressure differential across metering valve aperture 89. The force exerted by spring 79 is equivalent to the effective area of diaphragm 27 multiplied by the desired pressure differential. Adjustment screw 81 provides a means to accurately calibrate the position of diaphragm 27 as a result of an operational pressure differential while the system is operating. Bi-metallic Belleville disks 80 adjust the load exerted by spring 79 to compensate for modulus changes in spring 79 and specific gravity changes in the fuel, with respect to temperature.

Alignment of valve seat 83 and aperture 73 is maintained by a spiral cut washer 77 which permits freedom of axial motion at the center of the diaphragm while restricting lateral motion. The spiral cut washer 77 is coupled to diaphragm retainer 30 to radially position diaphragm 27. Cover 32 and head sensor assembly 21 are secured in place by ring 34 threaded to housing 36.

In more particular detail as shown in FIG. 3, head sensor assembly 21 includes the movable diaphragm 27 and a ported sleeve 23 which in turn retains or houses an axially movable spool 25. Diaphragm 27 carries valve seat 83 which maintains an equilibrium null height of the hydraulic coupling with spool 25 by varying the entrance area of aperture 73 as a function of the amount of flow through fixed area orifice 75 and a force exerted on a first end of spool 25 by a differential of a low return pressure present at annulus 50, the pressure present in variable volume chamber 71 and a force exerted on a second end of spool 25 by the high supply pressure in cavity 29, the variable volume pressure chamber 71 being formed by the area bounded by sleeve 23 and spool 25. When pressurized by way of aperture 73, communicating supply pressure chamber 29 to chamber 71 through the hollow interior of spool 25, spool 25 is urged downwardly as viewed. Diaphragm 27 motion in the downward direction separates the diaphragm seat 83 from the spool 25, opening the aperture entrance area 73 allowing high pressure fluid to enter the variable volume pressure chamber 71 and urge the spool 25 downwardly and back into equilibrium null height with the diaphragm valve seat 83. When the diaphragm 27 moves upwardly, the diaphragm valve seat 83 will reduce the aperture entrance area 73, reducing the pressure in chamber 71 as fluid exits to return pressure through fixed area orifice 75, urging the spool 25 to move in the upward direction as viewed in FIG. 2.

The ported sleeve 23 which retains or houses the axially movable spool 25 has four effective operational lands 41, 43, 45 and 47. Lands 43 and 45 are effective to control the position of throttling valve 17 and are connected to correspond to control ports 56 and 54 in ported sleeve 23. It should be noted that the shape of control ports 56 and 54 can be configured in a fashion that controls the desired positional gain or rate of travel of the downstream throttling valve 17 as a function of the stroke or position of spool valve 25. The head sensor assembly 21 has a high pressure inlet 49, a low pressure return 51, a first control connection 53 and a second control connection 55. When spool 25 is moved upwardly from an equilibrium position such as shown in FIG. 2, high pressure fuel from line 49 is passed into conduit 63 and conduit 65 is coupled to the low pressure return 51. In such a raised position, the spool 25 is effective to sequentially supply high pressure fluid to the annular first control connection 53, then to conduit 63 while the annular second control connection 55 is coupled to the low pressure return line 51. If the spool 25 moves downwardly from the position shown in FIG. 2, the high pressure source 49 would thereafter be connected to the second control connection 55 while the first control connection 53 would be coupled to return line 51.

The fuel flow restricting throttling valve assembly 17 which is also located in housing 36 includes a power piston 57 having equal effective first and second areas coupled to a tulip type or shaped throttling valve 91 and a throttling valve balance piston 92 which has an effective area equal to the throttling valve 91, that effectively negates pressure forces acting on the tulip shaped throttling valve 91. This balancing technique insures that the position of the throttling valve 91 is determined solely by the pressure acting on the power piston 57. Power piston 57, throttling valve 91 and balance piston 92 are reciprocative within throttling valve assembly 17 to regulate flow area through inlet opening 68 into the inlet 66 of vapor core high pressure pump 18 and throttle metered flow discharge pressure communicated through inlet 69 from metering valve 15. This throttled metered flow is then pressurized by the vapor core high pressure pump 18 and thereafter discharged through outlet passage 67 to afterburner nozzles 19.

Power piston 57 which defines a pair of variable volume chambers 59 and 61 within the throttling valve assembly 17 is connected to receive operational fluid pressure from head sensor assembly 21 as follows: variable volume chamber 59 is connected to the second control connection 55 through conduit 65 while variable volume chamber 61 is connected to the first control connection 53 through conduit 63. Balance piston 92 defines a first chamber 100 and a second chamber 102 within the throttling valve 91 such that pressure present at the inlet of conduit 69 is communicated to chamber 100 and the high pressure present in discharge passage 67 is communicated through passage 104 to chamber 102. The throttling valve 17 constitutes a variable flow restricting device which is coupled to and controlled by operational fluid pressure communicated from the first 53 and second 55 control connection of the head sensor 21 communicated to chamber 61 by way of conduit 63 and chamber 59 by way of conduit 65.

The method of operation of the dual signal head sensor is as follows: the pressures in cavity 37 and in cavity 39 as present across the metering aperture 89 are conveyed to the opposite sides of the diaphragm 27 in head sensor assembly 21. Movement of spool valve 25 is directly related to movement or motion of diaphragm 25 such that an increase in the fluid pressure differential as present across orifice 89 causes an additional flow restriction across orifice 68 by the flow restricting throttling valve assembly 17 while a decrease in the pressure differential across orifice 89 results in reduced flow restriction across orifice 68 by the valve 17 thereby restoring the metering aperture pressure differential to the preferred value.

If the pressure differential across the aperture 89 increases, diaphragm 27 moves away from the spool aperture 73 allowing high pressure fluid to enter the interior chamber 71 of the spool valve 25. The increase of pressure in chamber 71 acts on spool valve 25 forcing the spool to resume equilibrium null height between spool aperture 73 and diaphragm valve seat 83. At this new equilibrium point, the spool valve 25 is displaced downwardly from the position shown in FIG. 2 and the supply of high pressure on line 65 increases further closing or restricting the throttling valve assembly valve 17. The restriction of flow through orifice 68 results in an increase in the pressure in cavity 37 and as a result the pressure differential across orifice or metering aperture 89 is restored to the preferred value. Should the pressure in cavity 37 become too large or the pressure differential too small, diaphragm 27 is forced upwardly decreasing pressure in chamber 71 with the spool valve 25 following such movement. When the spool valve 25 moves in such a manner, high pressure is supplied to chamber 61 by way of line 63 which acts on piston 57 to move throttling valve 91 and open orifice 68 to relieve the pressure in cavity 37. Thus position of the spool valve 25 is proportional to head error.

We claim:

1. In a fuel system having a fuel pump for supplying metered fuel from a source to an engine by sequentially being communicated through a first variable area aperture in a flow metering valve and a second variable area aperture in a throttling valve, a control arrangement for maintaining a constant fuel pressure differential across the variable area aperture of the metering valve such that metered flow is solely a function of a scheduled metering valve position, said control arrangement comprising:

a dual signal head sensor assembly including a movable diaphragm, a ported sleeve having an axially movable spool, and a hydraulic coupling between a diaphragm and the movable spool whereby said spool moves in a direct relationship and in response to movement of said diaphragm;

means for replicating a pressure differential across said first variable area aperture of said metering valve across said diaphragm; and means responsive to movement of said spool for controlling the flow of fuel from said first variable aperture through said second variable aperture as a function of the movement of said spool.

2. The control arrangement of claim 1 wherein the means for replicating comprises:

first and second chambers separated by said diaphragm;

means for conveying the fuel pressure from a first cavity communicated to one side of said first variable area aperture to one of said first and second chambers; and means for conveying the fuel pressure from a second cavity communicated to the other side of said first variable area aperture to the other of said first and second chambers.

3. The control arrangement of claim 1 wherein said ported sleeve of dual signal head sensor assembly further includes a high pressure inlet, a low pressure return, and first and second control connections, and said spool includes a 4-land, 4-way movable cylindrical member, said cylindrical member being effective in certain positions to supply high pressure fluid to the first control connection while coupling the second control connection to a return line, and in other positions, to supply high pressure fluid to the second control connection while coupling the first control connection to the return line.

4. The control arrangement of claim 3 wherein said first and second control ports, acted on by two corresponding spool control lands are configurable in shape such as to control the rate of travel of a downstream throttling valve with respect to stroke of the movable spool valve, having the control ports connected to a pair of conduits for conveying fluid pressure from the control connections to respective variable volume chambers as the means for controlling an existing throttling valve which includes a piston within the throttling valve for controlling the fuel flow therethrough with the piston defining the pair of variable volume chambers on opposite sides thereof.

5. The control arrangement of claim 1 wherein said ported sleeve, a portion of said movable spool and a hollow area in the interior of said spool form a variable volume pressure chamber, said hydraulic coupling includes a seat and aperture adjacent to the diaphragm, and said diaphragm moves toward or away from said seat altering the equilibrium null height of the hydraulic coupling to cause a pressure change in said variable volume pressure chamber and as a result said spool is correspondingly moved with said diaphragm.

6. The control arrangement of claim 5 wherein said hydraulic coupling allows a diaphragm position to be freely altered by minimal variations in fluid pressure to thereby alter an equilibrium null height and correspondingly causing pressure changes in said variable volume pressure chamber, said hydraulic coupling amplifying the forces acting on the movable spool valve.

7. The control arrangement of claim 6 wherein pressure changes in said variable volume pressure chamber are achieved when said equilibrium null height is altered to cause the flow to be lower or higher than the flow through a fixed area orifice connecting a return pressure to the variable volume pressure chamber.

8. The control arrangement of claim 6 wherein an increase in the sensitivity and integrity of the head sensor assembly is achieved by allowing said diaphragm to freely position itself with respect to the pressure differential across the said variable area aperture, such pressure differential having force amplification to position the movable spool, and control ports shaped to control valve gain with a resulting greater accuracy and controlled rate of change for positioning said second variable area aperture of said throttling valve yielding improved overall accuracy in metered fuel flow and control system response.

9. The control arrangement of claim 5 wherein said seat for said diaphragm of said hydraulic coupling is constrained laterally while providing freedom of axial motion by way of a spiral cut washer to thereby maintain a coaxial alignment between said diaphragm seat and said hydraulic coupling aperture on said movable spool valve.

10. The control arrangement of claim 1 further comprising:

a selectable resilient spring bias for urging said diaphragm in a first axial direction to define a preferred pressure differential across said first variable area aperture.

11. The control arrangement of claim 10 further comprising:

means for altering said initial spring force bias by moving a grounding point of the spring through an external adjustment threaded member for calibration while flowing fuel.

12. The control arrangement of claim 10 further comprising:

bi-metallic Belleville disks to adjust the load exerted by the spring to compensate for modulus changes in the spring and specific gravity changes in the fuel with respect to temperature.

* * * * *